Sept. 22, 1964   E. S. BARNITZ ETAL   3,149,941
CHROMATOGRAPHY APPARATUS
Filed Dec. 30, 1957   2 Sheets-Sheet 1
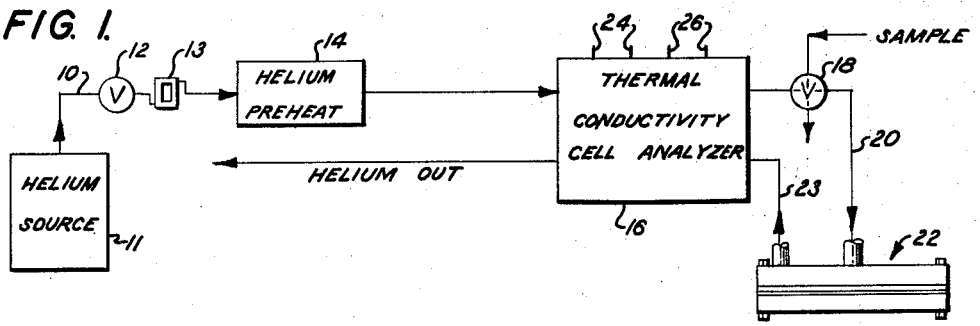
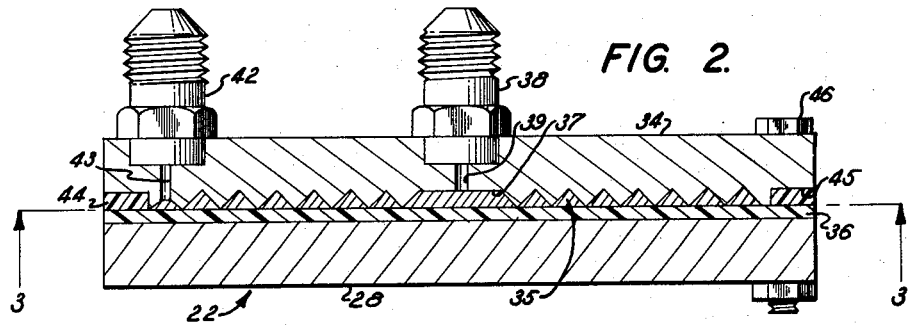
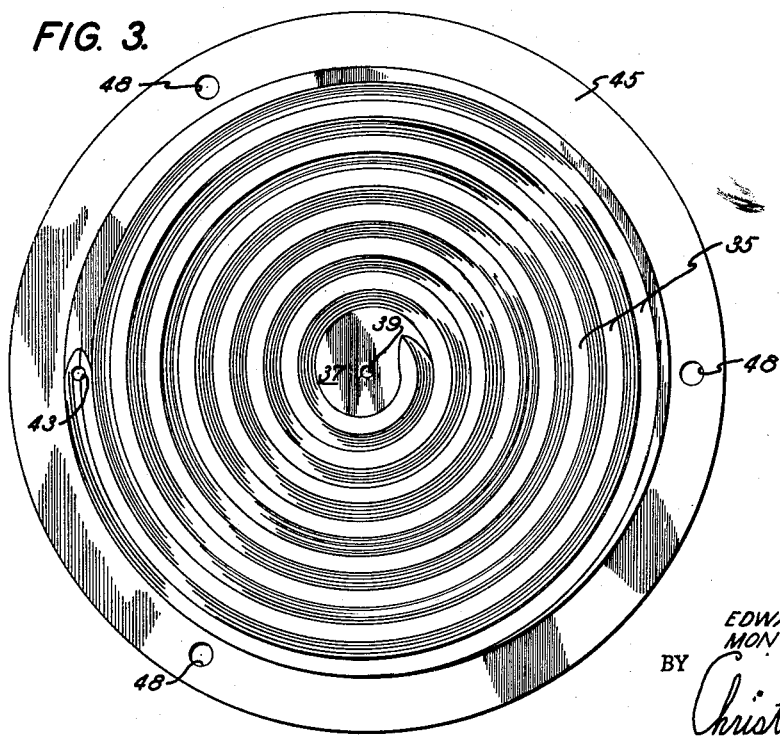
INVENTORS
EDWARD S. BARNITZ
MONTE L. MARKS
BY
Christie, Parker & Hale
ATTORNEYS Sept. 22, 1964 E. S. BARNITZ ETAL 3,149,941
CHROMATOGRAPHY APPARATUS
Filed Dec. 30, 1957 2 Sheets-Sheet 2

INVENTOR.
EDWARD S. BARNITZ
MONTE L. MARKS
BY Christie, Parker & Hale
ATTORNEYS

United States Patent Office 3,149,941
Patented Sept. 22, 1964

3,149,941
CHROMATOGRAPHY APPARATUS
Edward S. Barnitz, Rochester, N.Y., and Monte L. Marks, Pasadena, Calif., assignors, by mesne assignments, to Consolidated Electrodynamics Corporation, Pasadena, Calif., a corporation of California
Filed Dec. 30, 1957, Ser. No. 705,850
1 Claim. (Cl. 55—386)

This invention relates to chromatography and particularly to improvements in chromatographic columns.

Chromatography is an analytical technique for the resolution of components in a mixture. Separation of components is made by passing the mixture over an adsorbent medium which selectively retards certain components.

Because of its basic simplicity as a means of separating a mixture into its components, chromatography has rapidly become an analytical tool of wide and important uses.

Typical apparatus for the chromatographic analysis of fluids includes a long, small diameter column packed with adsorbent material such as silica-gel. The sample to be analyzed, say a gas mixture of various components, is mixed with a carrier gas and passed through the column. The column separates the sample into its constituent components.

On leaving the column, each component is carried through a device for measuring a certain characteristic of the component, such as thermal conductivity, which indicates what the component is.

The accuracy of chromatographic analysis is particularly sensitive to the uniformity of the adsorbent packing in the column and controlled temperature throughout the path of the gas stream.

In the chromatograph columns heretofore made from long tubes, uniform packing of the adsorbent is obtained by filling the tube from one end. The procedure is both difficult and expensive. If the packing proves unsatisfactory upon testing, the column is salvaged only by completely emptying it and refilling it with packing material.

In addition, to maintain a uniform temperature in the column, it is necessary to bend the filled column into a more compact form, such as a helical coil, which can be immersed in a constant temperature bath or oven. Such bending tends to cause pores or cavities in the packing material, and causes the packing to be of non-uniform density.

This invention provides a chromatographic column which is easily packed uniformly with adsorbent throughout its length, and the column is compact so that its temperature is readily controlled, thereby making it convenient and practical to use for commercial chromatographic analyses. In addition, the column is easily tapered to a reduced cross section near the outlet end to gain additional improvement in performance.

Briefly, the invention contemplates an improved column for chromatographic analyses in which a gas stream is passed through an adsorbent packing to bring about at least partial separation of a component thereof so the concentration of the component is decreased at one point in the stream and increased at another point. The column includes two plates disposed side by side with a tortuous channel in at least one of the plates at the interface between them. The adsorbent packing is disposed in the channel, and means are provided for holding the plates together.

These and other aspects of my invention will be more fully understood from the following detailed description taken in conjunction with the accompanying drawing in which:

FIG. 1 is a schematic flow diagram showing the use of the chromatograph column of this invention;

FIG. 2 is a sectional elevation of the chromatographic column shown in FIG. 1;

FIG. 3 is a view taken on line 3—3 of FIG. 2;

Figure 4:
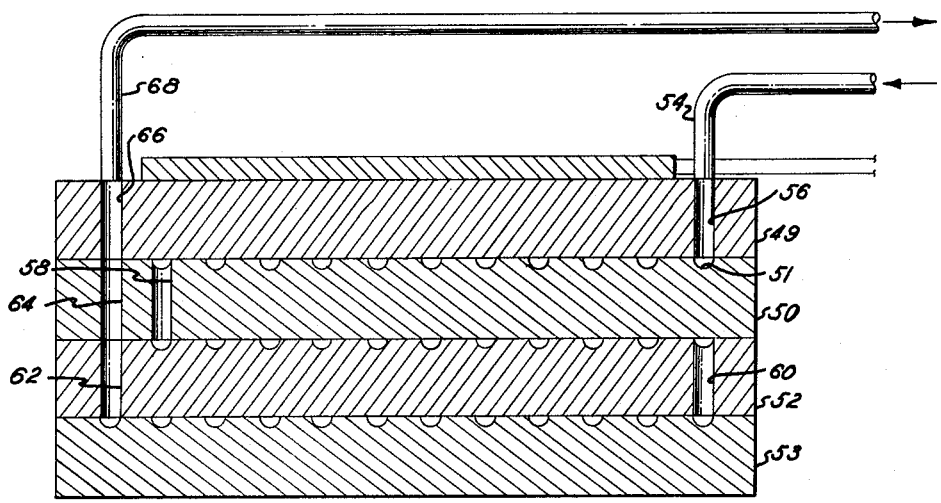
FIG. 4 is an alternate embodiment of the invention.

Referring to FIG. 1, a carrier gas such as helium is carried by a line 10 from a source 11 through a control valve 12 and flow meter 13 into a helium preheater 14. The carrier gas then passes through a first pair of four thermal conductivity cells connected together in a conventional manner in an analyzer 16 as two arms of a Wheatstone bridge. The carrier gas then flows through a four way sample dosing valve 18 and to an inlet line 20 into a chromatographic column 22. After passing through the interior of the chromatographic column, the carrier gas then flows from the column out an outlet line 23 back to the analyzer where it passes over a second pair of thermal conductivity cells connected to form the other two arms of the Wheatstone bridge. The carrier gas then exhausts to atmosphere from the analyzer. The Wheatstone bridge in the analyzer includes a pair of input terminals 24 and a pair of signal output terminals 26.

Referring to FIG. 2, the chromatographic column includes a first or lower circular plate 28 which has a smooth top surface.

A second or upper circular plate 34 of the same diameter as the lower plate has a spiral groove or channel 35 in its lower surface, which rests on a flat gasket 36 sandwiched between the two plates. The groove begins in a recess 37 formed in the center of the bottom surface of the top plate and terminates near the periphery of the plate (see FIG. 3). An upwardly projecting inlet fitting 38 is bonded to the center of the top surface of the upper plate and is connected by a vertical bore 39 with the central recess in the grooved surface of the top plate. An upwardly projecting outlet fitting 42 is bonded to the periphery of the top surface of the upper plate and is connected by a vertical bore 43 to the outer end of the spiraled groove. An annular gasket 44 is disposed in an annular groove 45 in the periphery of the lower surface of the upper plate to effect a seal between the periphery of the upper plate and the flat gasket. The two plates are held in compression against the flat gasket by a plurality of bolts 46 located in matching bores 48 around the peripheries of the upper and lower plates. As shown in FIGS. 2 and 3, the outer end of the groove is tapered to reduced width and depth to give the outlet end of the column a gradually decreasing cross section in the direction of fluid flow.

The chromatographic column shown in FIGS. 1 through 3 can easily and inexpensively be machined or cast and assembled. Prior to assembly, the adsorbent packing, which may be suitably coated with adsorbent, is uniformly tamped into the spiral groove of the upper plate, the upper plate being inverted from the position shown in FIG. 2 during the tamping operation. In this way, it is easy to ascertain by visual inspection the proper packing of the chromatographic column. Moreover, there is no problem presented of possible cavitation of the adsorbent such as sometimes occurs when packed tubes are bent in the form of tight spirals.

The flat gasket, which preferably is of a material inert at the operating temperatures of the chromatographic column, is then disposed over the packed groove, the annular gasket having already been placed in the position shown in FIG. 2. The second plate is then clamped against the first plate as shown in FIG. 2 to sandwich the gaskets and adsorbent material between the two plates, and the assembled column is turned over and connected to the inlet and outlet lines as shown in FIG. 1.

The plates may be made of any suitable material, but preferably they are made of a metal of high heat conductivity, such as brass. Also, the abutting surfaces of the plates are highly polished to effect a good seal.

An important advantage of the chromatographic column just described is that should the packing prove to be unfit upon testing, or after extensive use, the column is readily salvaged by opening it up, and inspecting the packed adsorbent for signs of channeling or cavitation. The advantage of this procedure over having to unpack and repack completely a spiral tube is readily apparent.

In the operation of the apparatus of FIG. 1, suitable heating means (not shown), which may be conventional, maintain the thermal conductivity cells of the analyzer and the chromatographic column at the desired temperature. When an analysis is to be made, the four-way sample valve is rotated 90° so that a small, accurate volume of sample is introduced in the stream of carrier gas. The sample and carrier pass through the chromatographic column, where the various components of the sample are separated according to their respective retention times. The emergence of each component of the sample from the chromatographic column is detected and measured by the analyzer.

Figure 5:
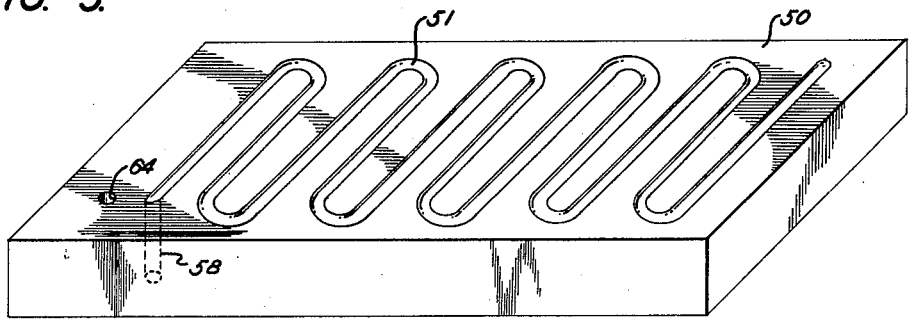
FIG. 5 is a perspective view showing one of the plates of FIG. 4.

FIG. 4 is a schematic view of an alternate embodiment of the invention in which a plurality of plates are sandwiched together to provide a long chromatographic column which is easily maintained at a uniform temperature. A top plate 49 rests on the upper surface of a first intermediate plate 50 which has a serpentine groove 51 in its upper surface as shown most clearly in FIG. 5. The first intermediate plate rests on a second intermediate plate 52 which is similarly grooved in its upper surface. The second intermediate plate rests on the top of a bottom plate 53 similarly grooved in its upper surface. The matching surfaces are highly polished and coated with a suitable sealant, such as a high temperature, low volatility, and inert silicone grease. Each groove is packed with a suitable adsorbent.

Carrier gas and sample flows from an inlet line 54 down a vertical bore 56 in the top plate and into one end of the groove in the first intermediate plate. A vertical bore 58 in the first intermediate plate connects the opposite end of the groove to an end of the groove in the second intermediate plate. A vertical bore 60 in the second intermediate plate connects the opposite end of the groove to one end of the groove in the bottom grooved plate. The other end of the groove in the bottom plate is connected by collinear bores 62, 64 and 66 in the second intermediate plate, the first intermediate plate, and the top cover plate, respectively, to an outlet line 68. The plates of the chromatographic column shown in FIG. 4 are clamped and sealed together by suitable means such as those shown for the chromatographic column of FIG. 2. The operation of the column of FIG. 4 is the same as that of FIG. 1.

We claim:

An apparatus for treating gas mixtures by gas chromatography which includes two parallel matching plates disposed face to face, one of said plates having a tortuous channel on the face thereof facing the other plate, said tortuous channel containing a sorbent which is effective for chromatographically treating gas mixtures, an inlet port at one end of said channel, an outlet port at the other end of said channel, and means for securing said plates in fluid-tight relationship to prevent gas from flowing outside of said channel as it flows through said channed from said inlet port to said outlet port.

References Cited in the file of this patent

UNITED STATES PATENTS

| | | |
|---|---|---|
| 2,118,290 | Black | May 24, 1938 |
| 2,236,084 | Brown | Mar. 25, 1941 |
| 2,502,545 | Wellborn | Apr. 4, 1950 |
| 2,511,733 | Morrison | June 13, 1950 |
| 2,650,269 | Webb | Aug. 25, 1953 |
| 2,764,251 | Jessop | Sept. 25, 1956 |
| 2,839,152 | Tracht | June 17, 1958 |
| 2,841,005 | Coggeshall | July 1, 1958 |